United States Patent Office
3,276,862
Patented Oct. 4, 1966

3,276,862
METHOD OF SEPARATING HAFNIUM FROM ZIRCONIUM
Horace W. Chandler, New York, N.Y., assignor to Isomet Corporation, Palisades Park, N.J., a corporation of New Jersey
No Drawing. Filed Oct. 24, 1962, Ser. No. 232,890
8 Claims. (Cl. 75—84.5)

This invention relates to a method of separating hafnium from zirconium and more particularly this invention relates to the separation of hafnium from zirconium by non-aqueous techniques.

Metal compounds exist in nature in various combinations. Often it becomes necessary to extract a single element from the naturally existing compounds. In most instances this extraction, or separation of the desired element from the remaining elements, is quite simple and follows standard procedures. However there are naturally occurring compositions containing at least two elements which are so alike chemically that standard separation procedures do not provide the desired separation at all or do not provide the desired separation with an adequate yield. The problem can arise in the separation of isotopes of elements, due to the normally very similar chemical properties thereof. It has been found that certain elements, when found together, either in nature or otherwise, present the same separation problems as are encountered in the separation of isotopes. Two particular metals presenting this problem are hafnium and zirconium.

According to the present state of the art, hafnium is separated from zirconium metal, in the preparation of pure zirconium metal, by reacting zirconium silicate containing small amounts of hafnium and carbon in an electric furnace, to remove much of the silica to yield a product that can easily be chlorinated to provide impure zirconium tetrachloride. The zirconium tetrachloride is then purified by distillation or by treatment with water to produce solutions which may be treated by solvent extraction to separate the zirconium from the hafnium. A typical solvent extraction process of the type indicated above would include the use of tributyl phosphate in kerosene. This step is followed by nitric acid scrubbing to remove the hafnium. In this process the hafnium goes into the aqueous phase while the zirconium remains in the organic phase. Zirconium is recovered containing less than fifty parts per million of hafnium.

The disadvantages of the above method of solvent extraction for washing zirconium metal to remove hafnium is that raw materials must be reconstituted from whatever metal is produced in the last stage. The most common process for making zirconium is by reducing anhydrous zirconium tetrachloride with magnesium, so that, following solvent extraction, the zirconium oxide product (now hafnium free) must be rechlorinated to give zirconium tetrachloride. The extraction of hafnium metal from zirconium metal could be greatly improved and provide greater yields if the requirement for the second chlorination is eliminated.

Such an improved process is obtained by the passage of vapors containing both zirconium tetrachloride and hafnium tetrachloride over a bed containing zirconium dioxide and hafnium dioxide at elevated temperature. In the above reaction, the hafnium tetrachloride reacts with the zirconium dioxide to form volatile zirconium tetrachloride, which mixes with the zirconium tetrachloride previously in the vapor phase. The hafnium tetrachloride probably enriches the bed by being converted to hafnium dioxide. In this manner no solvent extraction step is necessary to separate the hafnium from the zirconium, the hafnium free zirconium being immediately available, as zirconium tetrachloride, for reduction to metallic zirconium by reaction with magnesium.

It is therefore an object of this invention to provide a method of separating hafnium metal from zirconium metal using non-aqueous techniques.

It is a further object of this invention to provide a method of separating hafnium from zirconium by obtaining hafnium free zirconium tetrachloride using but a single chlorination step.

It is a still further object of this invention to provide a method of separating hafnium metal from zirconium metal by passing the tetrachlorides of zirconium and hafnium simultaneously over a bed containing the oxides of hafnium and zirconium at elevated temperature to obtain hafnium free zirconium tetrachloride.

The above objects and still other objects of this invention will become obvious to those skilled in the art after a careful reading of the following detailed description of a preferred embodiment of the invention, which is provided by way of example.

It has been found that passage of the mixed vapors of zirconium tetrachloride and hafnium tetrachloride over a bed containing zirconium dioxide and hafnium dioxide effects the removal of the hafnium tetrachloride from the vapor and results in the production of an effluent vapor that is markedly lowered in hafnium content. Although the exact mechanism of this removal process is not known, it is believed that a reaction of the following type takes place:

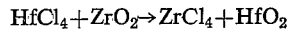
$$HfCl_4 + ZrO_2 \rightarrow ZrCl_4 + HfO_2$$

In the above reaction, the hafnium tetrachloride in the mixed $HfCl_4$—$ZrCl_4$ vapor stream reacts with the zirconium dioxide in the mixed $ZrO_2$—$HfO_2$ bed to form volatile zirconium tetrachloride which passes into the effluent vapor, and solid $HfO_2$ which deposits in the bed. It is thus probable (the exact mechanism not being known) that the hafnium is being enriched in the bed as $HfO_2$ at the same time that the zirconium is being enriched in the vapor as $ZrCl_4$. It is thus seen that no solvent extraction step is necessary to separate the hafnium from the zirconium and that the hafnium-free zirconium is immediately available, as $ZrCl_4$, for reduction to metallic zirconium by magnesium.

The reaction of the $HfCl_4$ with the $ZrO_2$ has been found most effective for temperatures ranging from 300° C. to 1000° C. in promoting the removal of the $HfCl_4$ from the mixed $HfCl_4$—$ZrCl_4$ vapors. An example of the results obtained is given in the experimental data obtained in the experiment described hereinbelow:

Twelve grams of zirconium dioxide which contained 3% hafnium oxide was mixed with 3 grams of carbon. About half of this mixture was placed in Vycor glass tube, ½ inch in diameter. The mixture was spread along five inches of the tube. A quantity of quartz wool was then placed between the $ZrO_2$-carbon mixture and about fifteen inches of zirconium oxide pellets which contained 3% $HfO_2$. The whole tube was then inserted in a furnace, which was then heated to 950° C. with dry nitrogen flowing though the Vycor tube. After three hours of nitrogen purging at this temperature, all moisture has been removed from the bed and chlorine gas was then admitted to the bed. The chlorination of the $ZrO_2$ and $HfO_2$ was carried out at 950° C. according to the following reactions:

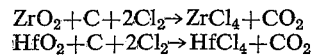
$$ZrO_2 + C + 2Cl_2 \rightarrow ZrCl_4 + CO_2$$
$$HfO_2 + C + 2Cl_2 \rightarrow HfCl_4 + CO_2$$

The reaction was continued for two hours during which time the $ZrCl_2$—$HfCl_4$ vapors passed through the fifteen inches of the $ZrO_2$—$HfO_2$ mixture which was also held at 950° C. The vapors emerging from this bed were cooled to room temperature and the ZrCl$_4$—HfCl$_4$ condensed as a pure white solid.

The white solids reacted vigorously with water and were converted to oxides by repeated aqueous hydrolysis and firing to red heat. The final oxide product of this hydrolysis was pure white.

A sample of the original ZrO$_2$ which was known to contain 3% hafnium oxide, and a sample of the oxides prepared by hydrolysis of the ZrCl$_4$—HfCl$_4$ product that emerged from the reactor were analyzed for hafnium/zirconium ratio using the X-ray fluorescence technique of Birks and Brooks (L. S. Birks, E. J. Brooks, Anal. Chem., 22, 1017, 1950). The following results were obtained (expressed as the ratio of two spectral intensities characteristic of hafnium and zirconium).

| Sample | Hafnium L$\beta_2$/ Zirconium K$\beta_1$ | Percent Hf |
|---|---|---|
| Original ZrO$_2$ | 0.183 | 3 |
| Final ZrO$_2$ (From hydrolysis of chloride product.) | 0.061 | 1 |

It is thus seen that passage of the mixed HfCl$_4$—ZrCl$_4$ vapors through fifteen inches of a ZrO$_2$—HfO$_2$ bed removed at least two thirds of the hafnium from the mixed vapor stream, thereby giving a product enriched in zirconium.

Although the reaction conditions have been cited in the example, this should not be construed to limit the process to these conditions. Other temperatures and bed lengths could be used depending on requirements. It is therefore intended that the following claims be construed as broadly as possible in view of the prior art.

What is claimed is:

1. In a process for separating zirconium from an oxidic mixture of zirconium and hafnium, the steps of:
   (a) mixing a portion of the oxidic mixture with carbon to form a first bed;
   (b) forming a second bed with the remainder of the oxidic mixture;
   (c) passing chlorine gas over and in contact with the first bed at temperature in the range from approximately 300° C. to 1000° C. to produce a reaction therebetween in which a gaseous mixture of HfCl$_4$ and ZrCl$_4$ is formed;
   (d) passing said gaseous mixture over and in contact with the second bed while maintaining said temperature to produce a reaction therebetween in which the HfCl$_4$ in said gaseous mixture reacts with ZrO$_2$ in the oxidic mixture to form volatile ZrCl$_4$ which passes into the effluent vapor and HfO$_2$ which is deposited as a solid in the second bed; and
   (e) recovering the ZrCl$_4$ enriched effluent vapor for reduction thereof to metallic zirconium.

2. The process according to claim 1 wherein said reduction is accomplished by reacting the ZrCl$_4$ enriched effluent vapor with magnesium.

3. A process for separating hafnium from zirconium, which comprises passing mixed vapors of HfCl$_4$ and ZrCl$_4$ through a bed of mixed ZrO$_2$ and HfO$_2$ while maintaining the temperature of the bed within a range from about 300° C. to 1000° C., to produce a reaction between the HfCl$_4$ in said mixed vapors and the ZrO$_2$ in said bed to form volatile ZrCl$_4$ which passes into the effluent vapor and solid HfO$_2$ which is deposited in said bed; and recovering the effluent vapor for reduction thereof to metallic zirconium.

4. The process according to claim 3 wherein said reduction is accomplished by reacting the effluent vapor with magnesium.

5. The process according to claim 4 wherein said mixed vapors are obtained by chlorinating a mixture of ZrO$_2$, HfO$_2$ and C.

6. A process for separating zirconium from a mixture containing zirconium and hafnium oxides, comprising the steps of forming a bed of said mixture, maintaining the bed at elevated temperatures within the range from about 300° C. to about 1000° C. while contacting the bed with a vapor stream of zirconium tetrachloride and hafnium tetrachloride to produce a reaction in which the hafnium tetrachloride reacts with zirconium dioxide in the bed to form solid hafnium dioxide and volatile zirconium tetrachloride, whereby to substantially reduce the hafnium content of the vapor stream and the zirconium content of the bed, and removing the zirconium tetrachloride-enriched vapor stream from the reaction zone for recovery of metallic zirconium therefrom.

7. The process according to claim 6 wherein said vapor stream of zirconium tetrachloride and hafnium tetrachloride is produced by passing a stream of chlorine gas over a bed containing a mixture of zirconium and hafnium oxides with carbon, maintained at said elevated temperatures.

8. The process according to claim 6 wherein zirconium is recovered from the effluent vapor stream by a reaction thereof with magnesium.

References Cited by the Examiner

UNITED STATES PATENTS 1,376,161   4/1921   Pugh _____ 23—24.1
2,951,742   9/1960   Scheller _____ 23—17 X

FOREIGN PATENTS 586,395   11/1959   Canada.

OTHER REFERENCES

Miller, Metallurgy of the Rarer Metals-2 Zirconium, 2nd ed., Butterworths Scientific Publications, London 1957, pages 48 and 49.

OSCAR R. VERTIZ, *Primary Examiner.*

BENJAMIN HENKIN, MILTON WEISSMAN,
*Examiners.*

H. T. CARTER, *Assistant Examiner.*